No. 778,445.

Patented December 27, 1904.

UNITED STATES PATENT OFFICE.

HERBERT H. CHURCH, OF BELLOWS FALLS, VERMONT, ASSIGNOR TO CASEIN COMPANY OF AMERICA, A CORPORATION OF NEW JERSEY.

WAX EMULSION AND PROCESS OF PRODUCING SAME.

SPECIFICATION forming part of Letters Patent No. 778,445, dated December 27, 1904.

Application filed April 5, 1904. Serial No. 201,756.

*To all whom it may concern:*

Be it known that I, HERBERT H. CHURCH, a citizen of the United States, residing at Bellows Falls, in the county of Windham and State of Vermont, have invented certain new and useful Improvements in Wax Emulsions and Processes of Producing Same, of which the following is a specification.

This invention or discovery has for its object to combine paraffin with water and alkali to form a saponified product which can be used in the manufacture of paper, as also for textile and for laundry uses.

It is well known that alkalies or alkaline substances do not have a saponifying action when added to melted paraffin and water. I have discovered, however, that it is possible to make this combination by combining stearic acid with paraffin and Chinese vegetable tallow, so as to produce a very smooth soft white emulsified mixture adapted for use in the arts and capable of production at comparatively little cost.

This paraffin-wax emulsion may be produced in the following manner: To fifty parts, by weight, of paraffin-wax, fifty parts, by weight, of Chinese vegetable tallow, and fifty parts, by weight, of stearic acid are added about four hundred parts, by weight, of water. These ingredients are then thoroughly heated until the solid substances are completely melted. To the hot liquid is then preferably added about five parts, by weight, of trisodium phosphate and five parts, by weight, of caustic soda, both previously dissolved in a small quantity of water, or instead of these last-named ingredients other alkalies or alkaline substances may be employed. The mixture should then be kept heated to the boiling-point with continual agitation. This heating and agitation should be kept up for at least half an hour after the addition of the trisodium phosphate and soda or other alkaline substance. When these last-named ingredients have first been added, the mixture will froth or foam considerably, and it is important to continue the boiling and agitation until such frothing or foaming has ceased, and which will require at least half an hour. When the frothing or foaming has ceased and the product is cooled, the result will be a perfectly smooth and white wax emulsion.

This invention or discovery is not to be understood as being limited to the exact proportions of the ingredients stated or to the use of any particular alkali, as other alkalies or alkaline substances than those referred to may be employed with good results.

Having thus described my invention or discovery, I claim and desire to secure by Letters Patent—

1. The herein-described wax emulsion comprising paraffin-wax, stearic acid, Chinese vegetable tallow, water, and an alkaline substance, in substantially the proportions stated.

2. The herein-described wax emulsion consisting of about fifty parts of paraffin-wax, fifty parts of stearic acid, fifty parts of Chinese vegetable tallow, five parts of trisodium phosphate, five parts caustic soda, and water.

3. The herein-described process of producing a wax emulsion, consisting in melting paraffin-wax, Chinese vegetable tallow and stearic acid in water, with the aid of heat, then adding an alkaline solution to the mixture, then boiling the said mixture for half an hour or more, with continual agitation, until foaming or frothing thereof has ceased.

4. The herein-described process of producing a wax emulsion consisting in melting paraffin-wax, Chinese vegetable tallow, and stearic acid in water with the aid of heat, then adding a solution of trisodium phosphate and caustic soda to the mixture, and subsequently boiling the said mixture for half an hour or more, with continual agitation, until foaming or frothing thereof has ceased.

In testimony whereof I affix my signature in presence of two witnesses.

HERBERT H. CHURCH.

Witnesses:
LOUIS H. SMITH,
A. F. GRIGNON.